Sept. 26, 1944.  G. F. BROW ET AL  2,358,772
METHOD OF CUTTING ALUMINUM
Filed Nov. 20, 1943
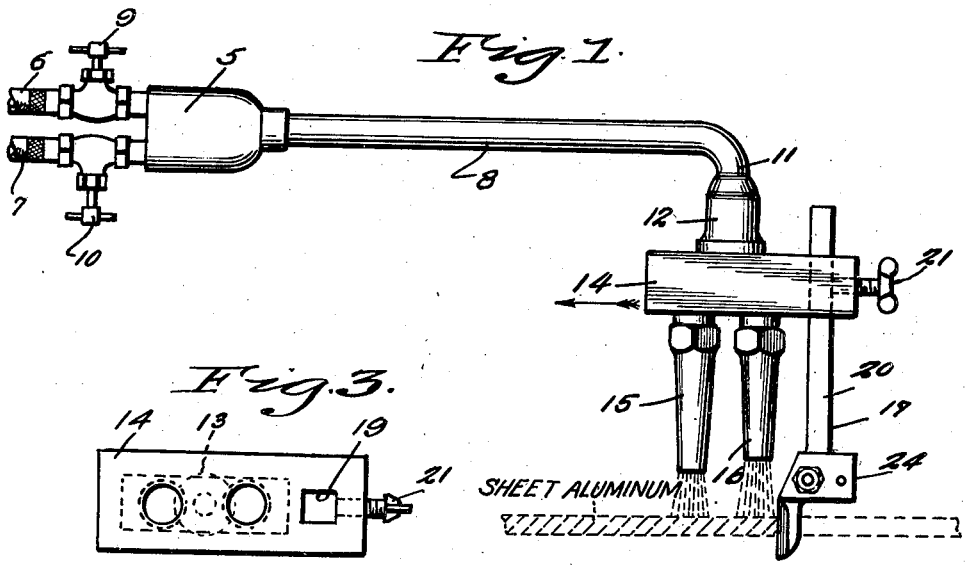
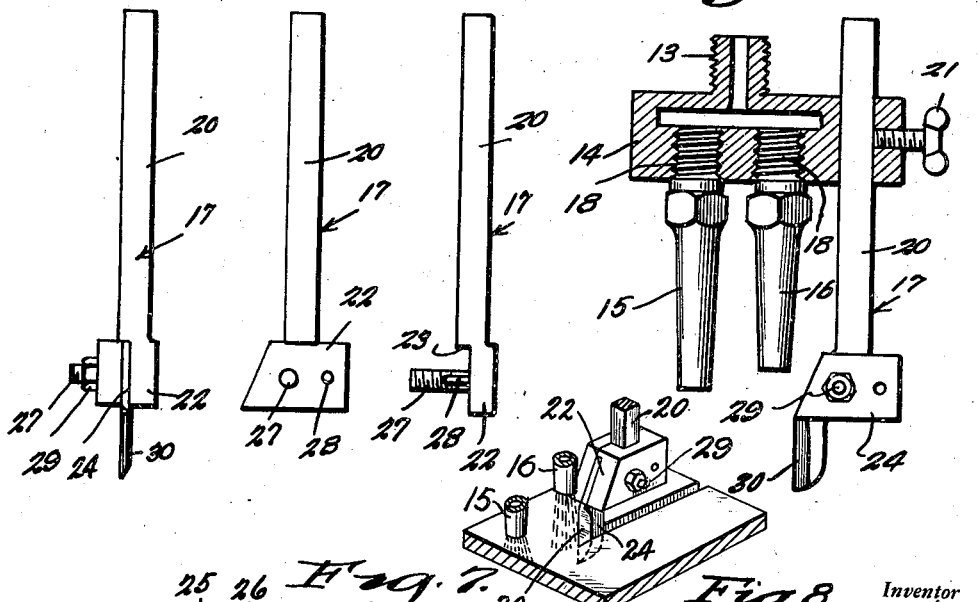
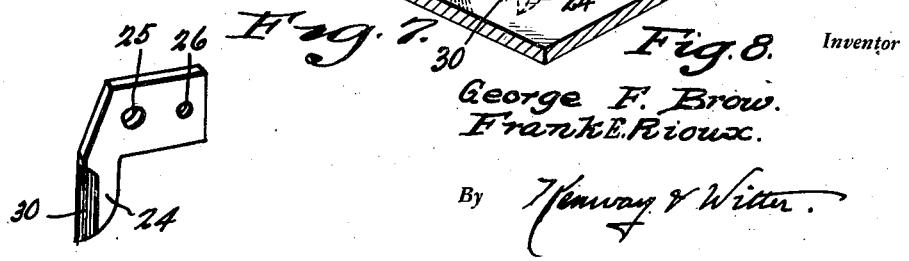
Inventor
George F. Brow.
Frank E. Rioux.
By Kenway & Witter
Attorneys Patented Sept. 26, 1944

2,358,772

UNITED STATES PATENT OFFICE 2,358,772

METHOD OF CUTTING ALUMINUM

George F. Brow, East Braintree, and Frank E. Rioux, North Attleboro, Mass.

Application November 20, 1943, Serial No. 511,196

4 Claims. (Cl. 164—17)

This invention relates to an improved method of cutting aluminum, and more particularly to the cutting of sheets or plates of aluminum, magnesia, or alloys of light metals. In our Patent No. 2,341,358, dated February 8, 1944, we have disclosed and claimed a preferred form of apparatus for carrying out our invention. Heretofore, aluminum has ordinarily been cut by an oxyacetylene flame directed thereagainst for a period of time sufficient to melt the aluminum and blow it out of place thereby forming a gap or cut. This operation ordinarily results in a forming gap of one-half inch or more in width and leaves extremely jagged edges which require substantial trimming or machining operations. Our invention contemplates a method adapted to cut aluminum or the like not only economically and efficiently but also with a narrow cut leaving smooth and clean cut edges.

We have discovered that, by employing a first step of heating the metal to a degree softening it to a severable consistency and a second step of advancing a blade through the heated metal while in such condition, we are able to secure results of unexpected character and of the greatest practical value. The heating and severing steps are ordinarily carried out progressively across the sheet or body of metal being cut, the heating step somewhat preceding and preparing the material for the severing step, and while the heating can be performed in any suitable manner, as by a flame or electrically, we preferably employ a gaseous flame and immediately follow the same with the severing knife or blade positioned to pass cleanly through the heated and softened metal and running edgewise through the sheet metal along the line of cut. The primary object of our invention resides in the production of such an improved method for the purpose described.

These and other features of the invention will be best understood and appreciated from the following description of a preferred embodiment of apparatus for carrying the invention into practice, selected for purposes of illustration and shown in the accompanying drawing in which, Fig. 1 is a side elevation of the apparatus in use, Fig. 2 is a vertical sectional view through the head structure, Fig. 3 is a bottom plan view of the head structure with the burner tip and cutter removed, Fig. 4 is a front elevation of the cutter, Fig. 5 is a side elevation of the cutter unit with the blade removed, Fig. 6 is a front elevation of the structure shown in Fig. 5, Fig. 7 is a perspective view of the cutter blade, Fig. 8 is a fragmentary perspective view illustrating the apparatus in use.

In the drawing, 5 indicates a gas mixing union to which gas lines 6 and 7 are connected and from which extends a tube 8. Valves 9 and 10 are provided in the usual way for controlling the supply of gas to the union 5. The pipe 8 has a laterally disposed end portion 11 terminating in a threaded socket 12 for the reception of a threaded nipple 13 carried on a head or box 14. Numerals 15 and 16 indicate a pair of flame tips screw-threaded into the head 14. The forward tip 15 is slightly longer than the rearward tip 16 and the latter is followed by a cutter unit supported in the head and generally indicated by reference character 17.

The head 14 is chambered in its forward portion to receive the gaseous mixture from the tube 8 and conduct it to the tips 15 and 16, and the rearward portion is recessed at 19 to receive the shank 20 of the cutter unit which is held in place by a set screw 21. The lower end of the shank is offset at 22 defining a shoulder 23 against which can abut the upper end body portion of an inverted L-shaped blade 24. The body portion is formed with openings 25 and 26 to receive a stud bolt 27 and a retaining pin 28 carried by the offset portion 22. A nut 29 on the bolt 27 is adapted to secure the blade in place against the offset portion 22. The downwardly projecting cutting portion of the blade has a forwardly directed cutting edge 30 located in line with and rearwardly of the tips 15 and 16.

In operation, the device is moved forwardly (to the left, Figs. 1 and 2) over and relative to the metal sheet or object to be cut and is so located that flames from the tips 15 and 16 play onto the sheet just in advance of the cutter. The relative speed of movement of the device and sheet is such that the metal is brought to the proper severing consistency when engaged by the cutter so that the cutter readily passes therethrough in a manner leaving clean cut edges. The relatively longer tip 15 provides a flame somewhat closer to the metal and more remote from the cutter and the tip 16 completes the heating step and keeps the metal softened while the cutter is passing therethrough. It will be apparent that either the cutting device or the work can be moved to provide the relative movement for the cutting operation.

In cutting sheet aluminum with the device above described we find that before the heated metal reaches a condition of redness it becomes softened to a degree that permits the blade to be advanced rapidly through it in edgewise relation, leaving a clean narrow cut without any objectionable tendency to distort the metal at the sides of the cut and without melting the metal or causing the formation of beads or lumps therein.

Having thus described our invention what we claim as new and desire to secure by Letters Patent of the United States is:

1. A method of cutting sheet aluminum or the like, which consists in softening the same by heat progressively along the proposed cutting line, and progressively severing the metal by passing a knife blade therethrough following the softening operation and while the metal remains softened from the heat.

2. A method of cutting sheet aluminum or the like, which consists in playing a gaseous flame progressively along the proposed cutting line to soften the metal, and progressively severing the metal by passing a knife therethrough along the line following the softening operation and while the metal remains softened from the heat.

3. A method of cutting sheet aluminum which includes the steps of rapidly moving a source of heat across the surface of the sheet in a relation progressively softening the aluminum in a relatively narrow zone, and immediately following the softening of the aluminum by moving an unheated blade edgewise through said zone to sever the sheet.

4. A method of cutting sheet aluminum and like metals which includes the steps of moving a source of heat across the surface of the metal sheet thereby heating it progressively in a relatively narrow band, and immediately following along the band, when and where the metal is heated, by a moving blade cutting simultaneously through both the upper and lower surfaces of the sheet metal.

GEORGE F. BROW.
FRANK E. RIOUX.

CERTIFICATE OF CORRECTION.

Patent No. 2,358,772.                              September 26, 1944.

GEORGE F. BROW, ET AL.

It is hereby certified that error appears in the printed specification of the above numbered patent requiring correction as follows: Page 2, first column, line 21, claim 1, after the word "therethrough" insert --along the line--; and that the said Letters Patent should be read with this correction therein that the same may conform to the record of the case in the Patent Office.

Signed and sealed this 28th day of November, A. D. 1944.

Leslie Frazer (Seal)                              Acting Commissioner of Patents.